United States Patent
Lee et al.

(10) Patent No.: US 10,165,572 B2
(45) Date of Patent: Dec. 25, 2018

(54) METHOD AND APPARATUS FOR CANCELING TRIGGERED BUFFER STATUS REPORT FOR DEVICE-TO-DEVICE TRANSMISSION IN WIRELESS COMMUNICATION SYSTEM

(71) Applicant: LG ELECTRONICS INC., Seoul (KR)

(72) Inventors: Youngdae Lee, Seoul (KR); Seungjune Yi, Seoul (KR); Sunyoung Lee, Seoul (KR); Sunghoon Jung, Seoul (KR)

(73) Assignee: LG Electronics Inc., Seoul (KR)

(*) Notice: Subject to any disclaimer, the term of this patent is extended or adjusted under 35 U.S.C. 154(b) by 153 days.

(21) Appl. No.: 15/116,159

(22) PCT Filed: Mar. 19, 2015

(86) PCT No.: PCT/KR2015/002682
§ 371 (c)(1),
(2) Date: Aug. 2, 2016

(87) PCT Pub. No.: WO2015/142081
PCT Pub. Date: Sep. 24, 2015

(65) Prior Publication Data
US 2017/0188349 A1     Jun. 29, 2017

Related U.S. Application Data

(60) Provisional application No. 61/955,609, filed on Mar. 19, 2014, provisional application No. 61/955,778, (Continued)

(51) Int. Cl.
*H04W 72/12* (2009.01)
*H04W 72/04* (2009.01)
(Continued)

(52) U.S. Cl.
CPC ......... *H04W 72/048* (2013.01); *H04W 4/023* (2013.01); *H04W 28/0278* (2013.01);
(Continued)

(58) Field of Classification Search
None
See application file for complete search history.

(56) References Cited

U.S. PATENT DOCUMENTS

| 2011/0038339 A1 | 2/2011 | Zhang |
| 2011/0055387 A1 | 3/2011 | Tseng et al. |

(Continued)

FOREIGN PATENT DOCUMENTS

| CN | 102006151 A | 4/2011 |
| CN | 102334370 A | 1/2012 |

(Continued)

OTHER PUBLICATIONS

Ericsson, "Resouce allocation for D2D transmitters in coverage," 3GPP TSG-RAN WG2 #85, Feb. 10-14, 2014, R2-140625.
(Continued)

*Primary Examiner* — Chi H Pham
*Assistant Examiner* — Shick C Hom
(74) *Attorney, Agent, or Firm* — Dentons US LLP

(57) ABSTRACT

A method and apparatus for canceling a triggered proximity-based services (ProSe) buffer status report (BSR) in a wireless communication system is provided. A user equipment (UE) triggers at least one ProSe BSR, and cancels all triggered ProSe BSR if a specific condition is met. The specific condition may be that a device-to-device (D2D) scheduling assignment for a D2D scheduling period can accommodate all pending data available for D2D transmission or that the ProSe BSR is included in a media access control (MAC) protocol data unit (PDU) to be transmitted to a network.

11 Claims, 17 Drawing Sheets

Related U.S. Application Data filed on Mar. 19, 2014, provisional application No. 61/955,604, filed on Mar. 19, 2014.

(51) Int. Cl.

| | | |
|---|---|---|
| *H04W 76/14* | (2018.01) | |
| *H04W 4/02* | (2018.01) | |
| *H04W 28/02* | (2009.01) | |
| *H04W 4/90* | (2018.01) | |
| *H04W 12/06* | (2009.01) | |

(52) U.S. Cl.
CPC ... *H04W 72/1215* (2013.01); *H04W 72/1247* (2013.01); *H04W 72/1284* (2013.01); *H04W 76/14* (2018.02); *H04W 4/90* (2018.02); *H04W 12/06* (2013.01)

(56) References Cited

U.S. PATENT DOCUMENTS

| | | | |
|---|---|---|---|
| 2011/0255492 A1 | 10/2011 | Dai et al. | |
| 2012/0307767 A1* | 12/2012 | Yamada | H04W 74/02 370/329 |
| 2013/0322413 A1 | 12/2013 | Pelletier et al. | |
| 2014/0010179 A1 | 1/2014 | Lee | |
| 2014/0273943 A1* | 9/2014 | Wu | H04L 12/1485 455/406 |
| 2015/0016428 A1 | 1/2015 | Narasimha et al. | |
| 2017/0201904 A1* | 7/2017 | Lee | H04W 28/0278 |
| 2017/0280486 A1* | 9/2017 | Lee | H04W 76/002 |

FOREIGN PATENT DOCUMENTS

| | | |
|---|---|---|
| CN | 102958066 A | 3/2013 |
| JP | 2012227885 A | 11/2012 |
| JP | 2012528495 A | 11/2012 |
| WO | 2010145463 A1 | 12/2010 |
| WO | 2013177449 A1 | 11/2013 |
| WO | 2013183727 A1 | 12/2013 |
| WO | 2014/003327 A1 | 1/2014 |

OTHER PUBLICATIONS

Qualcomm Incorporated, "Background document for 'LTE Device to Device Proximity Services'—Work Item," 3GPP TSG RAN Meeting #63, Mar. 3-6, 2014, RP-140056.

Catt, "D2D Communication Resource Allocation Mode 1," 3GPP TSG RAN WG2 Meeting #85bis, Mar. 31-Apr. 4, 2014, R2-141195.

LG Electronics Inc., "Prioritization handling between Legacy BSR and ProSe BSR," 3GPP TSG-RAN WG2 Meeting #87bis, Oct. 6-10, 2014, R2-144587.

Change Request: ZTE, "Clarification for BSR transmission without enough UL resources," 3GPP TSG-RAN Meeting #68, Nov. 9-13, 2009, R2-096777.

* cited by examiner

FIG. 11

| R | R | E | LCID | | | Oct 1 |
| F | | L | | | | Oct 2 |
| L | | | | | | Oct 3 |

METHOD AND APPARATUS FOR CANCELING TRIGGERED BUFFER STATUS REPORT FOR DEVICE-TO-DEVICE TRANSMISSION IN WIRELESS COMMUNICATION SYSTEM

This application is a National Stage Entry of International Application No. PCT/KR2015/002682 filed Mar. 19, 2015, which claims priority to U.S. Provisional Application Nos. 61/955,609, 61/955,778 and 61/955,604 all filed Mar. 19, 2014, all of which are incorporated by reference for all purposes as if fully set forth herein.

BACKGROUND OF THE INVENTION

Field of the Invention

The present invention relates to wireless communications, and more particularly, to a method and apparatus for canceling a triggered buffer status report (BSRs) for device-to-device (D2D) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

A scheduling request (SR) is used for requesting uplink shared channel (UL-SCH) resources for new transmission. A buffer status reporting (BSR) procedure is used to provide the serving eNB (evolved NodeB) with information about the amount of data available for transmission in the uplink (UL) buffers of the UE. As ProSe is introduced in 3GPP LTE rel-12, SR for ProSe and/or BSR for ProSe may be newly defined. Accordingly, various operations related to the SR for ProSe and/or BSR for ProSe should be newly defined.

SUMMARY OF THE INVENTION

The present invention provides a method and apparatus for canceling triggered buffer status report (BSRs) for device-to-device (D2D) transmission in a wireless communication system. The present invention provides a method for canceling triggered proximity-based services (ProSe) BSR if a specific condition is met.

In an aspect, a method for canceling, by a user equipment (UE), a triggered proximity-based services (ProSe) buffer status report (BSR) in a wireless communication system is provided. The method includes triggering, by the UE, at least one ProSe BSR, and canceling, by the UE, all triggered ProSe BSR if a specific condition is met.

In another aspect, a user equipment (UE) configured to cancel a triggered proximity-based services (ProSe) buffer status report (BSR) in a wireless communication system is provided. The UE includes a radio frequency (RF) unit configured to transmit or receive a radio signal, and a processor coupled to the RF unit, and configured to trigger at least one ProSe BSR, and cancel all triggered ProSe BSR if a specific condition is met.

ProSe BSR can be canceled.

BRIEF DESCRIPTION OF THE DRAWINGS

FIG. 10 to FIG. 12 shows an example of a MAC PDU subheader.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
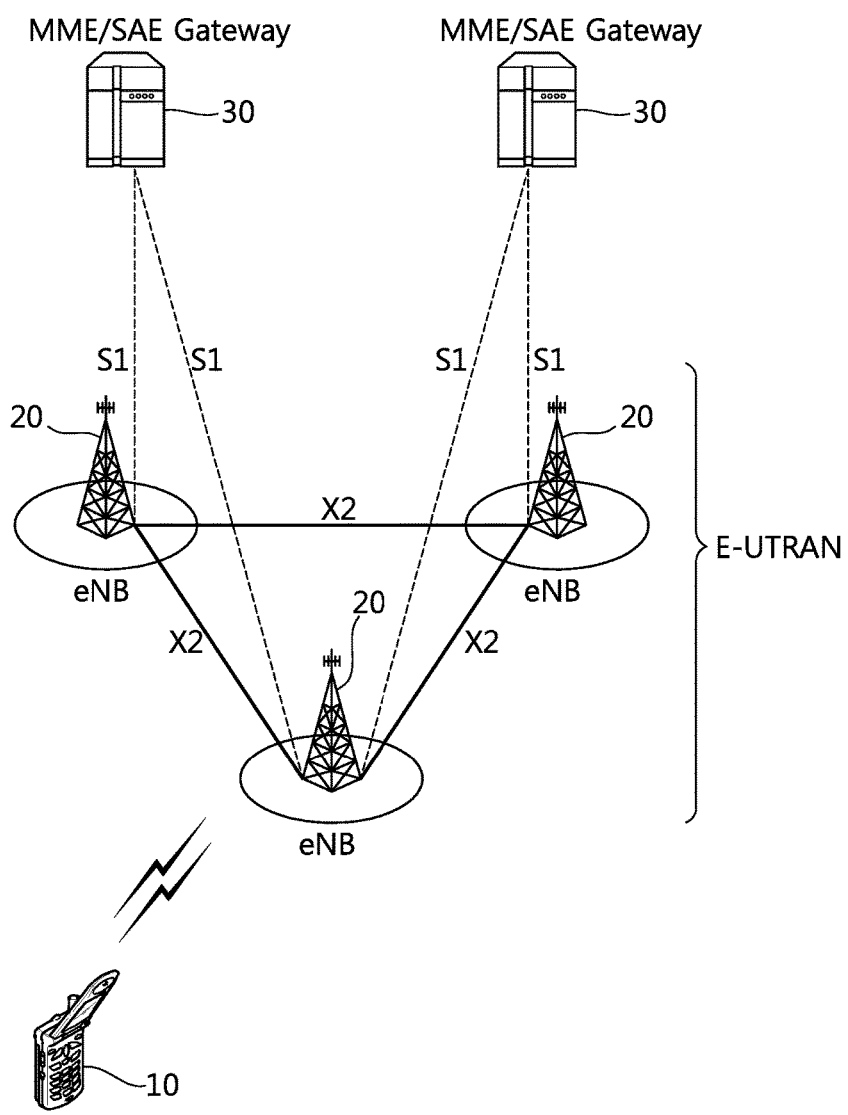
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
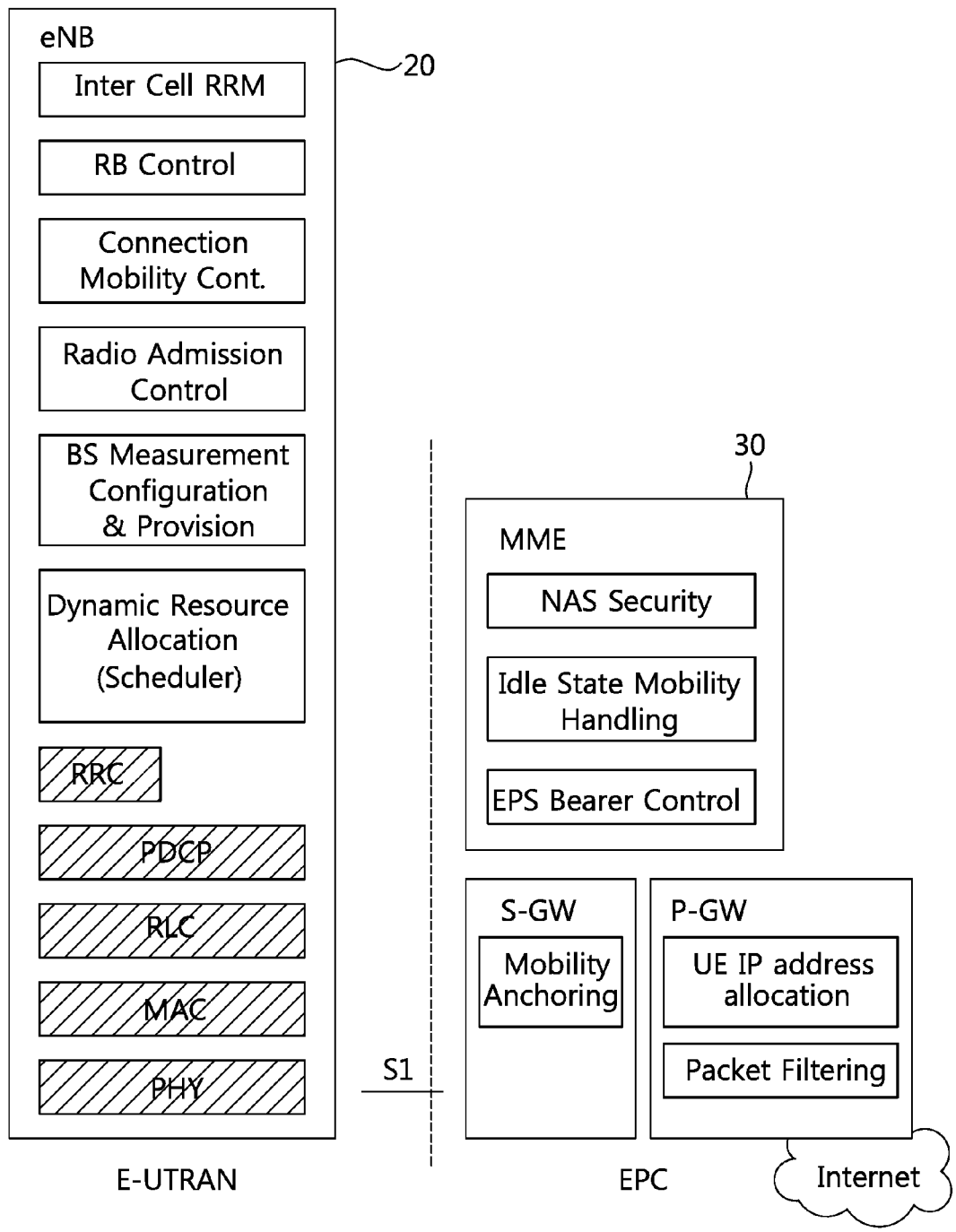
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
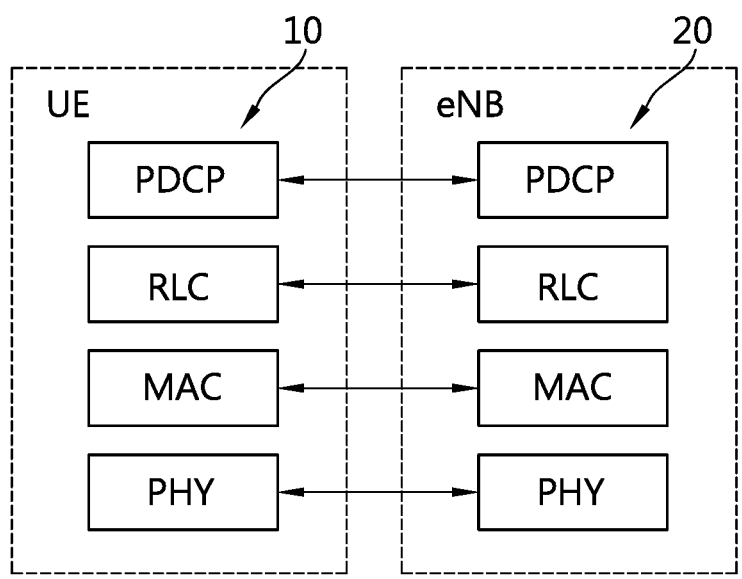
FIG. 3 shows a block diagram of a user plane protocol stack of an LTE system.
Figure 4:
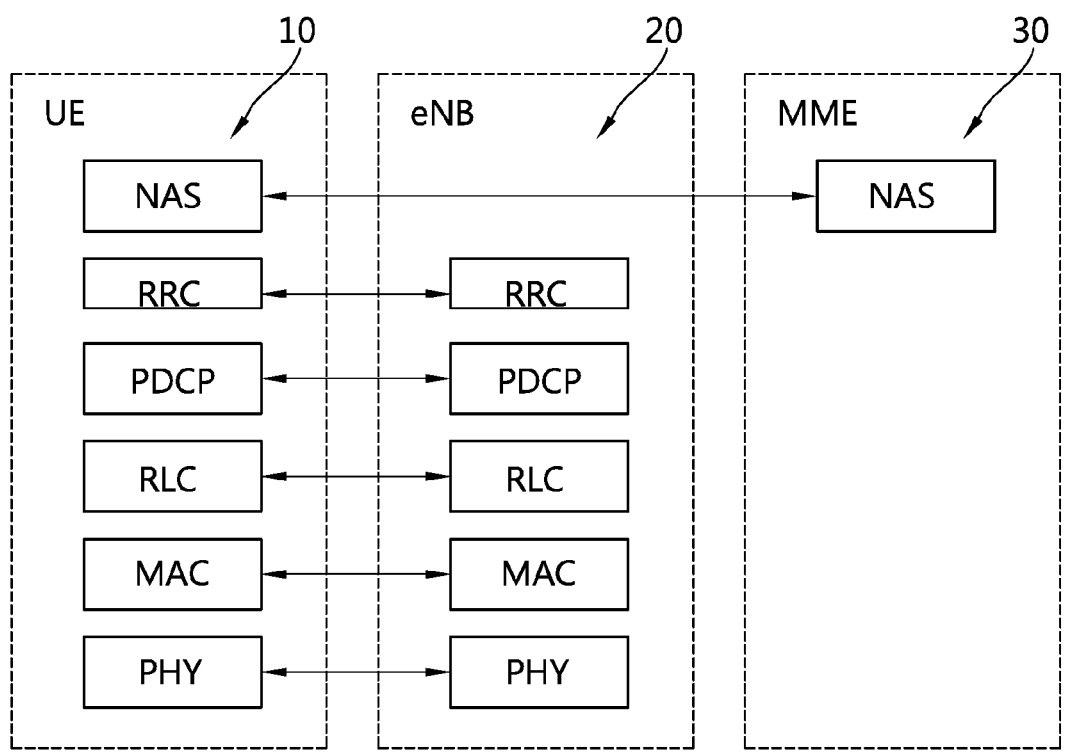
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
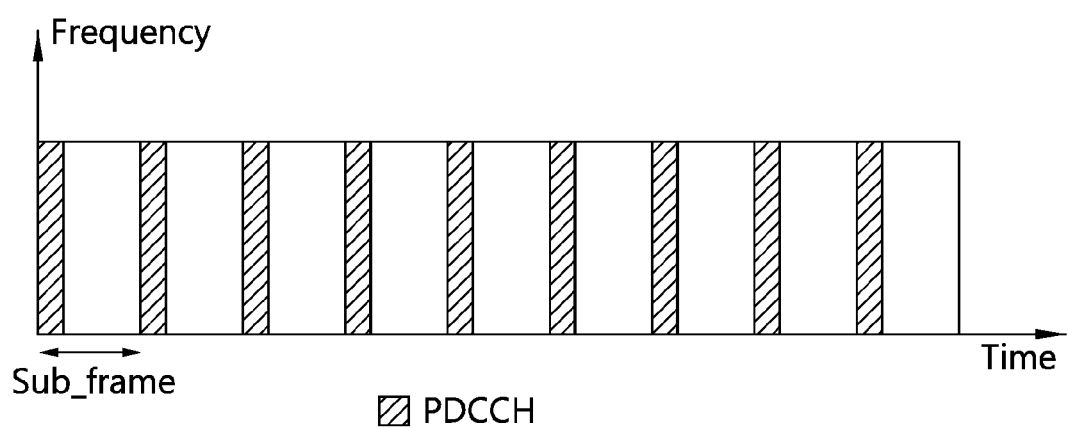
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Figure 6:
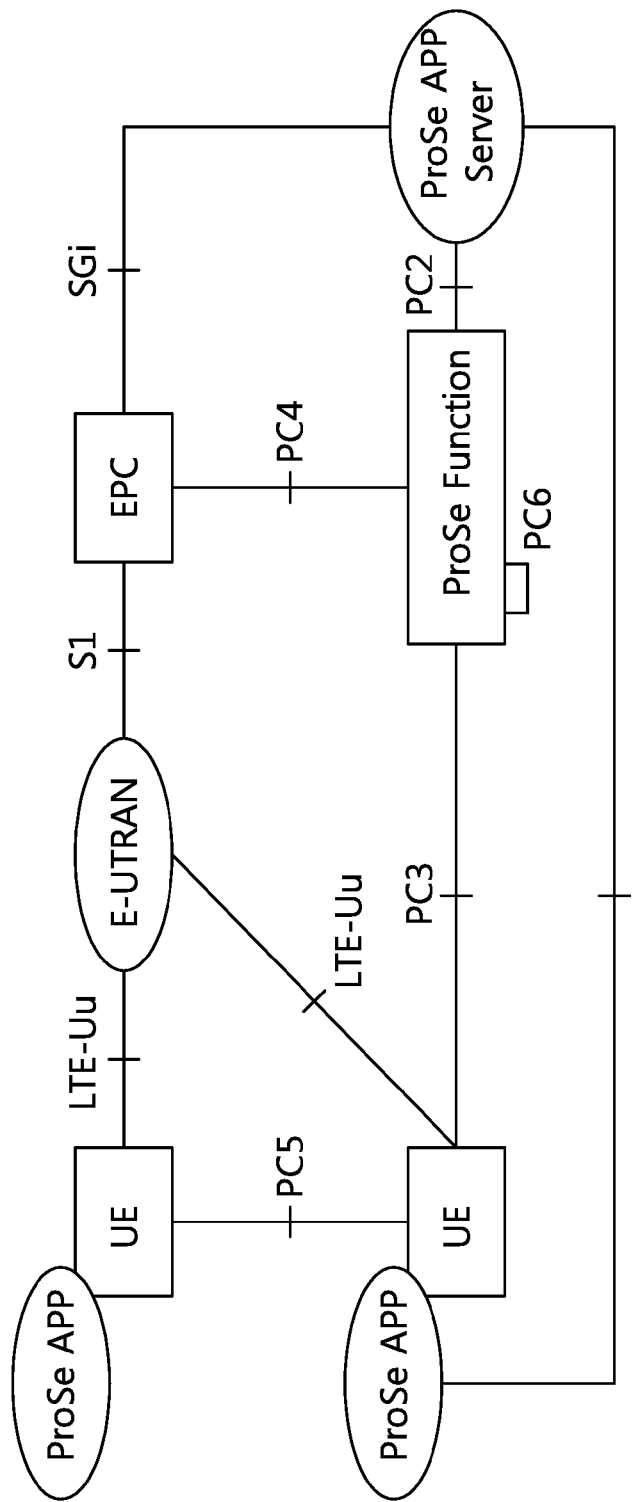
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications
Authorization and configuration of the UE for discovery and direct communication
Enable the functionality of the EPC level ProSe discovery
ProSe related new subscriber data and handling of data storage, and also handling of ProSe identities
Security related functionality
Provide control towards the EPC for policy related functionality
Provide functionality for charging (via or outside of EPC, e.g., offline charging) Reference points/interfaces in the reference architecture for ProSe are described.

PC1: It is the reference point between the ProSe application in the UE and in the ProSe application server. It is used to define application level signaling requirements.
PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.
PC3: It is the reference point between the UE and ProSe function. It is used to define the interaction between UE and ProSe function. An example may be to use for configuration for ProSe discovery and communication.
PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.
PC5: It is the reference point between UE to UE used for control and user plane for discovery and communication, for relay and one-to-one communication (between UEs directly and between UEs over LTE-Uu).
PC6: This reference point may be used for functions such as ProSe discovery between users subscribed to different PLMNs.
SGi: In addition to the relevant functions via SGi, it may be used for application data and application level control information exchange.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
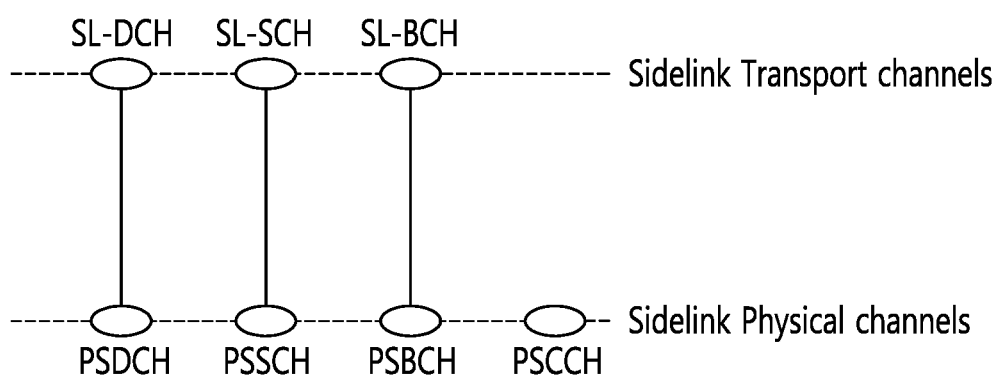
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:
fixed size, pre-defined format periodic broadcast transmission;
support for both UE autonomous resource selection and scheduled resource allocation by eNB;
collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:
support for broadcast transmission;
support for both UE autonomous resource selection and scheduled resource allocation by eNB;
collision risk due to support of UE autonomous resource selection; no collision when UE is allocated dedicated resources by the eNB;
support for HARQ combining, but no support for HARQ feedback;
support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
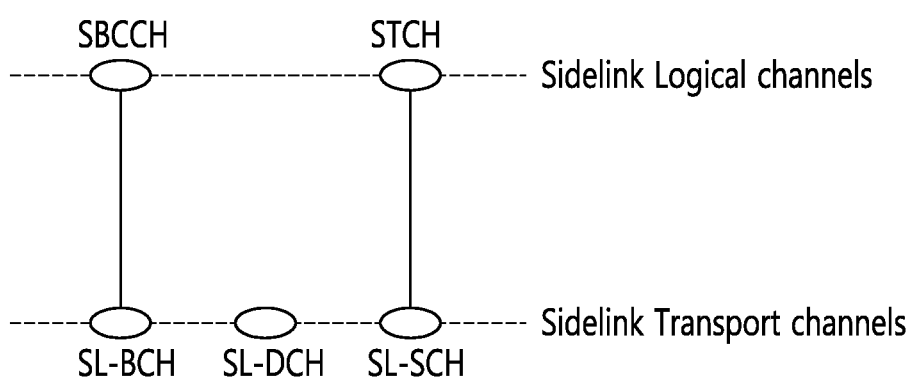
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

Scheduling request (SR) is described. It may be referred to Section 5.4.4 of 3GPP TS 36.321 V12.0.0 (2013-12). When an SR is triggered, it shall be considered as pending until it is cancelled. All pending SR(s) shall be cancelled and sr-ProhibitTimer shall be stopped when a MAC protocol data unit (PDU) is assembled and this PDU includes a buffer status report (BSR) which contains buffer status up to (and including) the last event that triggered a BSR, or when the UL grant(s) can accommodate all pending data available for transmission. If an SR is triggered and there is no other SR pending, the UE shall set the SR_COUNTER to 0.

As long as one SR is pending, the UE shall for each TTI:
1> if no UL-SCH resources are available for a transmission in this TTI:
2> if the UE has no valid physical uplink control channel (PUCCH) resource for SR configured in any TTI: initiate a random access procedure on the primary cell (PCell) and cancel all pending SRs;
2> else if the UE has a valid PUCCH resource for SR configured for this TTI and if this TTI is not part of a measurement gap and if sr-ProhibitTimer is not running:
3> if SR_COUNTER<dsr-TransMax:
4> increment SR_COUNTER by 1;
4> instruct the physical layer to signal the SR on PUCCH;
4> start the sr-ProhibitTimer.
3> else:
4> notify RRC to release PUCCH/sounding reference signal (SRS) for all serving cells;
4> clear any configured downlink assignments and uplink grants;
4> initiate a random access procedure on the PCell and cancel all pending SRs.

Buffer status reporting is described. It may be referred to Section 5.4.5 of 3GPP TS 36.321 V12.0.0 (2013-12). RRC controls BSR reporting by configuring the two timers periodicBSR-Timer and retxBSR-Timer and by, for each logical channel, optionally signalling logicalChannelGroup which allocates the logical channel to n logical channel group (LCG). For the buffer status reporting procedure, the UE shall consider all radio bearers which are not suspended and may consider radio bearers which are suspended.

A BSR shall be triggered if any of the following events occur:
UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";
UL resources are allocated and number of padding bits is equal to or larger than the size of the BSR MAC control element (CE) plus its subheader, in which case the BSR is referred below to as "padding BSR";
retxBSR-Timer expires and the UE has data available for transmission for any of the logical channels which belong to a LCG, in which case the BSR is referred below to as "regular BSR";
periodicBSR-Timer expires, in which case the BSR is referred below to as "periodic BSR".

For regular and periodic BSR:
if more than one LCG has data available for transmission in the TTI where the BSR is transmitted: report long BSR;
else report short BSR.

For padding BSR:
1> if the number of padding bits is equal to or larger than the size of the short BSR plus its subheader but smaller than the size of the long BSR plus its subheader,
2> if more than one LCG has data available for transmission in the TTI where the BSR is transmitted: report truncated BSR of the LCG with the highest priority logical channel with data available for transmission;
2> else report short BSR.
1> else if the number of padding bits is equal to or larger than the size of the long BSR plus its subheader, report long BSR.

If the buffer status reporting procedure determines that at least one BSR has been triggered and not cancelled:
1> if the UE has UL resources allocated for new transmission for this TTI:
2> instruct the multiplexing and assembly procedure to generate the BSR MAC CE(s);
2> start or restart periodicBSR-Timer except when all the generated BSRs are truncated BSRs;
2> start or restart retxBSR-Timer.
1> else if a regular BSR has been triggered:
2> if an uplink grant is not configured or the regular BSR was not triggered due to data becoming available for transmission for a logical channel for which logical channel SR masking (logicalChannelSR-Mask) is setup by upper layers:
3> a SR shall be triggered.

A MAC PDU shall contain at most one MAC BSR CE, even when multiple events trigger a BSR by the time a BSR can be transmitted in which case the regular BSR and the periodic BSR shall have precedence over the padding BSR. The UE shall restart retxBSR-Timer upon indication of a grant for transmission of new data on any UL-SCH. All triggered BSRs shall be cancelled in case the UL grant(s) in this subframe can accommodate all pending data available for transmission but is not sufficient to additionally accommodate the BSR MAC CE plus its subheader. All triggered BSRs shall be cancelled when a BSR is included in a MAC PDU for transmission. The UE shall transmit at most one regular/periodic BSR in a TTI. If the UE is requested to transmit multiple MAC PDUs in a TTI, it may include a padding BSR in any of the MAC PDUs which do not contain a regular/periodic BSR. All BSRs transmitted in a TTI always reflect the buffer status after all MAC PDUs have been built for this TTI. Each LCG shall report at the most one buffer status value per TTI and this value shall be reported in all BSRs reporting buffer status for this LCG. A padding BSR is not allowed to cancel a triggered regular/periodic BSR. A padding BSR is triggered for a specific MAC PDU only and the trigger is cancelled when this MAC PDU has been built.

Figure 9:
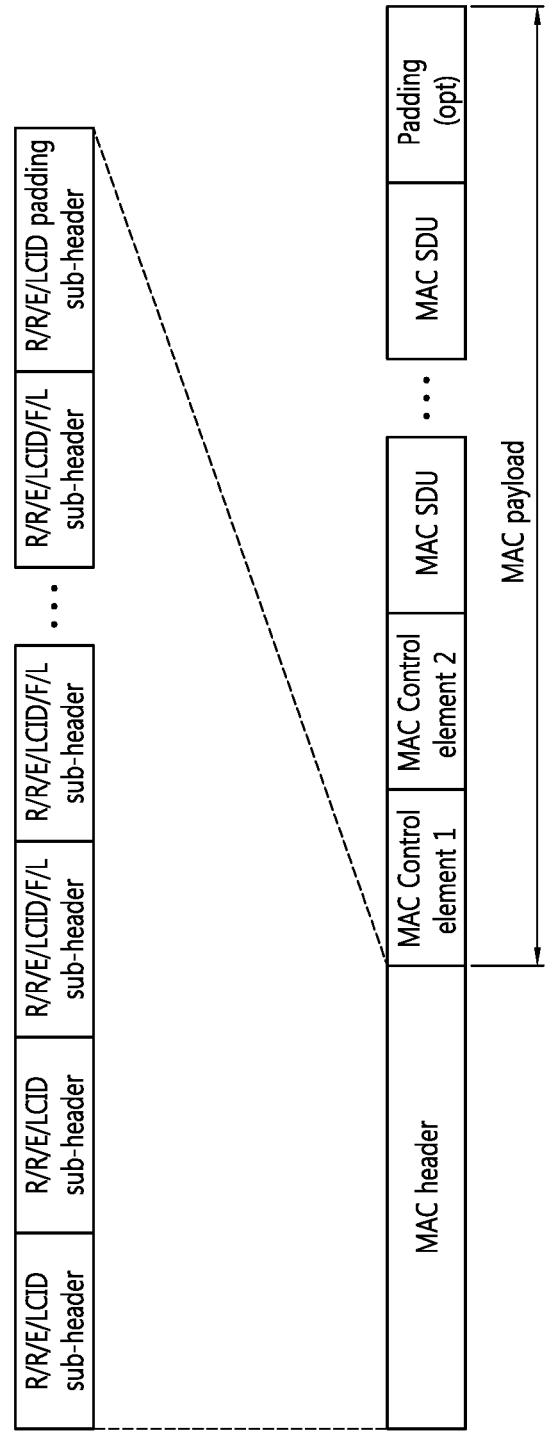
FIG. 9 shows an example of a MAC PDU.

FIG. 9 shows an example of a MAC PDU. A MAC PDU consists of a MAC header, zero or more MAC CEs, zero or more MAC service data units (SDUs), and optionally padding. Both the MAC header and the MAC SDUs are of variable sizes.

Figure 10:
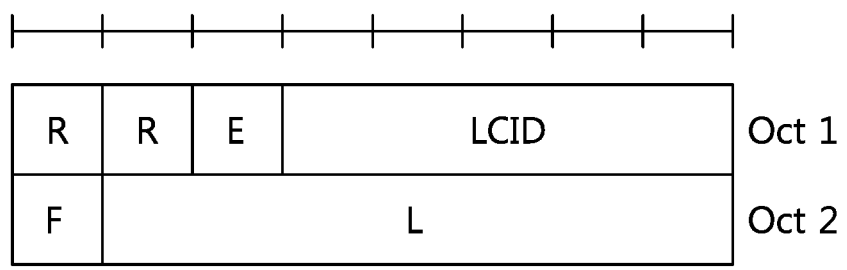
Figure 11:
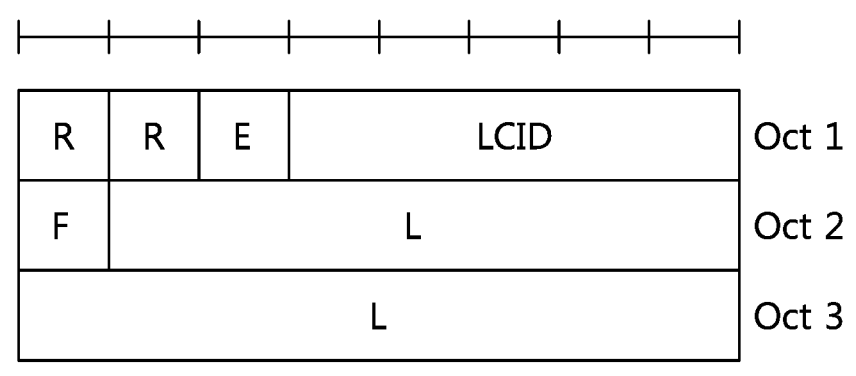
Figure 12:
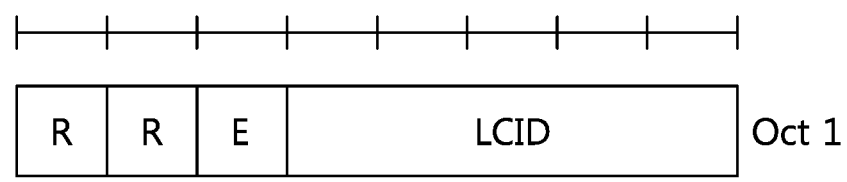

FIG. 10 to FIG. 12 shows an example of a MAC PDU subheader. A MAC PDU header consists of one or more MAC PDU subheaders. Each subheader corresponds to either a MAC SDU, a MAC CE or padding. A MAC PDU subheader consists of the six header fields R/R/E/LCID/F/L but for the last subheader in the MAC PDU and for fixed sized MAC CEs. FIG. 10 shows R/R/E/LCID/F/L MAC PDU subheader with 7-bits L field. FIG. 11 shows R/R/E/LCID/F/L MAC PDU subheader with 15-bits L field. The last subheader in the MAC PDU and subheaders for fixed sized MAC CEs consist solely of the four header fields R/R/E/LCID. A MAC PDU subheader corresponding to padding consists of the four header fields R/R/E/LCID. FIG. 12 shows R/R/E/LCID MAC PDU subheader. MAC PDU subheaders have the same order as the corresponding MAC SDUs, MAC CEs and padding.

MAC CEs are always placed before any MAC SDU. Padding occurs at the end of the MAC PDU, except when single-byte or two-byte padding is required. Padding may have any value and the UE shall ignore it. When padding is performed at the end of the MAC PDU, zero or more padding bytes are allowed. When single-byte or two-byte padding is required, one or two MAC PDU subheaders corresponding to padding are placed at the beginning of the MAC PDU before any other MAC PDU subheader. A maximum of one MAC PDU can be transmitted per transport block (TB) per UE. A maximum of one MCH MAC PDU can be transmitted per TTI.

Figure 13:
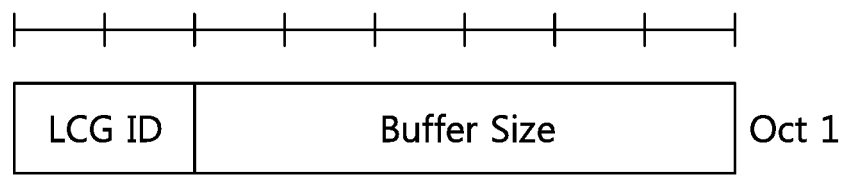
FIG. 13 and FIG. 14 show an example of a BSR MAC CE.
Figure 14:
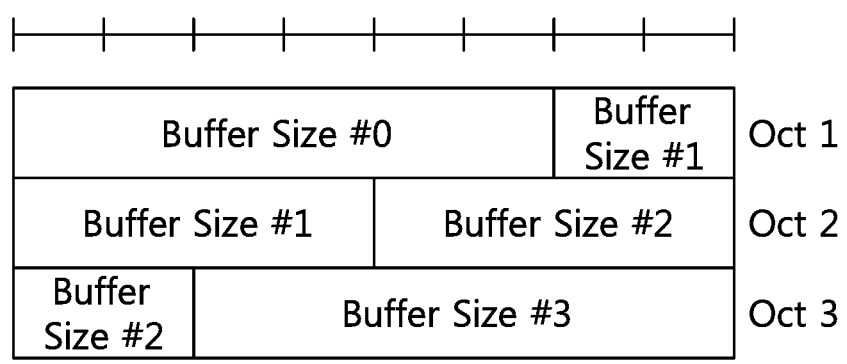

FIG. 13 and FIG. 14 show an example of a BSR MAC CE. FIG. 13 shows a short BSR and truncated BSR MAC CE, which includes one LCG ID field and one corresponding buffer size field. FIG. 14 shows a long BSR MAC CE, which includes four buffer size fields, corresponding to LCG IDs #0 through #3. The BSR formats are identified by MAC PDU subheaders with LCIDs. The fields LCG ID and buffer size are defined as follow:

LCG ID: The logical channel group ID field identifies the group of logical channel(s) which buffer status is being reported. The length of the field is 2 bits.

Buffer size: The buffer size field identifies the total amount of data available across all logical channels of a logical channel group after all MAC PDUs for the TTI have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the buffer size field are shown in Table 1 below. If extendedBSR-Sizes is configured, the values taken by the buffer size field are shown in Table 2 below.

TABLE 1

| Index | Buffer Size (BS) value [bytes] |
|---|---|
| 0 | BS = 0 |
| 1 | 0 < BS <= 10 |
| 2 | 10 < BS <= 12 |
| 3 | 12 < BS <= 14 |
| 4 | 14 < BS <= 17 |
| 5 | 17 < BS <= 19 |
| 6 | 19 < BS <= 22 |
| 7 | 22 < BS <= 26 |
| 8 | 26 < BS <= 31 |
| 9 | 31 < BS <= 36 |
| 10 | 36 < BS <= 42 |
| 11 | 42 < BS <= 49 |
| 12 | 49 < BS <= 57 |
| 13 | 57 < BS <= 67 |
| 14 | 67 < BS <= 78 |
| 15 | 78 < BS <= 91 |
| 16 | 91 < BS <= 107 |
| 17 | 107 < BS <= 125 |
| 18 | 125 < BS <= 146 |
| 19 | 146 < BS <= 171 |
| 20 | 171 < BS <= 200 |
| 21 | 200 < BS <= 234 |
| 22 | 234 < BS <= 274 |
| 23 | 274 < BS <= 321 |
| 24 | 321 < BS <= 376 |
| 25 | 376 < BS <= 440 |
| 26 | 440 < BS <= 515 |
| 27 | 515 < BS <= 603 |
| 28 | 603 < BS <= 706 |
| 29 | 706 < BS <= 826 |
| 30 | 826 < BS <= 967 |
| 31 | 967 < BS <= 1132 |
| 32 | 1132 < BS <= 1326 |
| 33 | 1326 < BS <= 1552 |
| 34 | 1552 < BS <= 1817 |
| 35 | 1817 < BS <= 2127 |
| 36 | 2127 < BS <= 2490 |
| 37 | 2490 < BS <= 2915 |
| 38 | 2915 < BS <= 3413 |
| 39 | 3413 < BS <= 3995 |
| 40 | 3995 < BS <= 4677 |
| 41 | 4677 < BS <= 5476 |
| 42 | 5476 < BS <= 6411 |
| 43 | 6411 < BS <= 7505 |
| 44 | 7505 < BS <= 8787 |
| 45 | 8787 < BS <= 10287 |
| 46 | 10287 < BS <= 12043 |
| 47 | 12043 < BS <= 14099 |
| 48 | 14099 < BS <= 16507 |
| 49 | 16507 < BS <= 19325 |
| 50 | 19325 < BS <= 22624 |
| 51 | 22624 < BS <= 26487 |
| 52 | 26487 < BS <= 31009 |
| 53 | 31009 < BS <= 36304 |
| 54 | 36304 < BS <= 42502 |
| 55 | 42502 < BS <= 49759 |
| 56 | 49759 < BS <= 58255 |
| 57 | 58255 < BS <= 68201 |
| 58 | 68201 < BS <= 79846 |
| 59 | 79846 < BS <= 93479 |
| 60 | 93479 < BS <= 109439 |
| 61 | 109439 < BS <= 128125 |
| 62 | 128125 < BS <= 150000 |
| 63 | BS > 150000 |

TABLE 2

| Index | Buffer Size (BS) value [bytes] |
|---|---|
| 0 | BS = 0 |
| 1 | 0 < BS <= 10 |
| 2 | 10 < BS <= 13 |
| 3 | 13 < BS <= 16 |
| 4 | 16 < BS <= 19 |
| 5 | 19 < BS <= 23 |
| 6 | 23 < BS <= 29 |
| 7 | 29 < BS <= 35 |
| 8 | 35 < BS <= 43 |
| 9 | 43 < BS <= 53 |
| 10 | 53 < BS <= 65 |
| 11 | 65 < BS <= 80 |
| 12 | 80 < BS <= 98 |
| 13 | 98 < BS <= 120 |
| 14 | 120 < BS <= 147 |
| 15 | 147 < BS <= 181 |
| 16 | 181 < BS <= 223 |
| 17 | 223 < BS <= 274 |

TABLE 2-continued

| Index | Buffer Size (BS) value [bytes] |
|---|---|
| 18 | 274 < BS <= 337 |
| 19 | 337 < BS <= 414 |
| 20 | 414 < BS <= 509 |
| 21 | 509 < BS <= 625 |
| 22 | 625 < BS <= 769 |
| 23 | 769 < BS <= 945 |
| 24 | 945 < BS <= 1162 |
| 25 | 1162 < BS <= 1429 |
| 26 | 1429 < BS <= 1757 |
| 27 | 1757 < BS <= 2161 |
| 28 | 2161 < BS <= 2657 |
| 29 | 2657 < BS <= 3267 |
| 30 | 3267 < BS <= 4017 |
| 31 | 4017 < BS <= 4940 |
| 32 | 4940 < BS <= 6074 |
| 33 | 6074 < BS <= 7469 |
| 34 | 7469 < BS <= 9185 |
| 35 | 9185 < BS <= 11294 |
| 36 | 11294 < BS <= 13888 |
| 37 | 13888 < BS <= 17077 |
| 38 | 17077 < BS <= 20999 |
| 39 | 20999 < BS <= 25822 |
| 40 | 25822 < BS <= 31752 |
| 41 | 31752 < BS <= 39045 |
| 42 | 39045 < BS <= 48012 |
| 43 | 48012 < BS <= 59039 |
| 44 | 59039 < BS <= 72598 |
| 45 | 72598 < BS <= 89272 |
| 46 | 89272 < BS <= 109774 |
| 47 | 109774 < BS <= 134986 |
| 48 | 134986 < BS <= 165989 |
| 49 | 165989 < BS <= 204111 |
| 50 | 204111 < BS <= 250990 |
| 51 | 250990 < BS <= 308634 |
| 52 | 308634 < BS <= 379519 |
| 53 | 379519 < BS <= 466683 |
| 54 | 466683 < BS <= 573866 |
| 55 | 573866 < BS <= 705666 |
| 56 | 705666 < BS <= 867737 |
| 57 | 867737 < BS <= 1067031 |
| 58 | 1067031 < BS <= 1312097 |
| 59 | 1312097 < BS <= 1613447 |
| 60 | 1613447 < BS <= 1984009 |
| 61 | 1984009 < BS <= 2439678 |
| 62 | 2439678 < BS <= 3000000 |
| 63 | BS > 3000000 |

As the Prose (and/or D2D) is introduced in 3GPP LTE rel-12, BSR for Prose (hereinafter, ProSe BSR) and/or SR for ProSe (hereinafter, ProSe SR) may be newly defined. Accordingly, various operations related to the ProSe BSR and/or ProSe SR may be also newly defined. For example, the UE may transmit the SR (dedicated SR (D-SR) or random access (RA)) to the eNB followed by the BSR based on which the eNB can determine that the UE intends to perform the D2D transmission as well as the required amount resources.

Hereinafter, various operations/features related to the ProSe BSR and/or ProSe SR according to an embodiment of the present invention is described. The ProSe BSR may be used to provide the network with information about amount of data available for the D2D transmission. It is assumed that the following UE MAC operation happens in a MAC entity configured in a UE for DL/UL transmission from/to the eNB. There is another MAC entity configured for D2D transmission and reception in this UE. It is further assumed that a D2D logical channel between a RLC entity and a MAC entity dedicated to D2D is defined for D2D transmission over direct interface among UEs.

(1) Priorities Between the Legacy BSR and ProSe BSR

As described above, the MAC PDU may contain at most one MAC BSR CE, even when multiple events trigger a BSR by the time a BSR can be transmitted. According to the prior art, if there is one BSR for data to be transmitted over Uu interface (i.e. uplink transmission from the UE to the eNB) and there is another BSR for D2D data to be transmitted over direct interface between UEs, but if a MAC PDU can only accommodate a single BSR, the UE cannot determine which BSR should be transmitted. In order to solve the problem described above, a method for determining priorities between the legacy BSR and ProSe BSR may be required.

Figure 15:
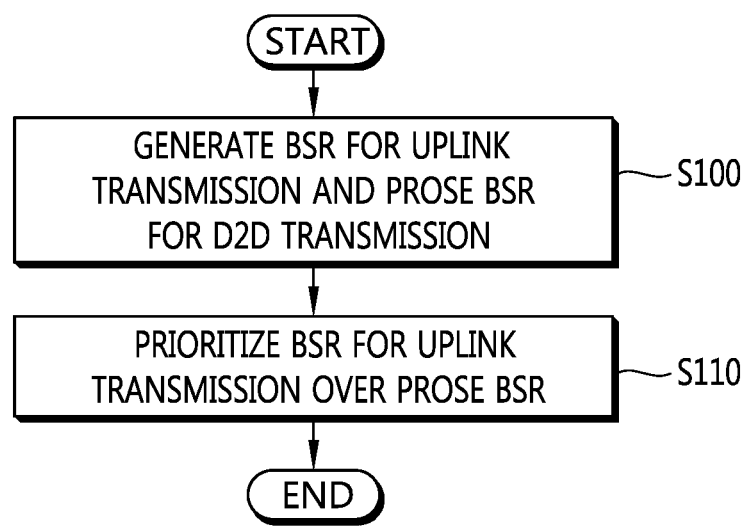
FIG. 15 shows an example of a method for determining priorities of BSRs according to an embodiment of the present invention.

FIG. 15 shows an example of a method for determining priorities of BSRs according to an embodiment of the present invention. In step S100, the UE generates the BSR for uplink transmission and the ProSe BSR for D2D transmission. In step S110, the UE prioritizes the BSR for uplink transmission over the ProSe BSR. That is, if short BSR or long BSR, which is legacy BSR, is available as well as ProSe BSR, ProSe BSR may be de-prioritized under short/long BSR for reporting. A MAC PDU may contain at most one MAC BSR CE for uplink transmission over Uu and, if possible, at most one MAC BSR CE for ProSe, even when multiple events trigger a BSR by the time a BSR can be transmitted in which case the regular BSR and the periodic BSR shall have precedence over the padding BSR. If a MAC PDU can only accommodate one MAC BSR CE, a BSR for uplink transmission may have precedence over a ProSe BSR.

(2) Additional Timers and LCG Defined for the ProSe BSR

According to an embodiment of the present invention, RRC may control BSR reporting by configuring the two timers periodicBSR-Timer and retxBSR-Timer for uplink transmission over Uu and additional two timers periodicD2DBSR-Timer and retxD2DBSR-Timer for D2D transmission, and by, for each logical channel, optionally signalling logicalChannelGroup which allocates the logical channel to an LCG. RRC may optionally signal D2DlogicalChannelGroup, for each D2D logical channel, which allocates the D2D logical channel to an LCG (i.e. D2D-LCG). RRC in eNB may signal D2DlogicalChannelGroup, for each D2D logical channel, to the UE. For the buffer status reporting procedure, the UE may consider all radio bearers, including all D2D radio bearers over direct interface among UEs, which are not suspended and may consider radio bearers which are suspended. All D2D radio bearers may be never suspended. Alternatively, the eNB may indicate to the UE which D2D radio bearer is suspended.

(3) New Trigger Conditions for the Legacy BSR and/or ProSe BSR

As the additional timers for the ProSe BSR is newly defined according to an embodiment of the present invention, trigger conditions for the legacy BSR and/or ProSe BSR may be also newly defined according to an embodiment of the present invention. A BSR shall be triggered if any of the following events occur:

UL data, for a logical channel which belongs to a LCG, becomes available for transmission in the RLC entity or in the PDCP entity and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "regular BSR";

D2D data, for a D2D logical channel (which belongs to a LCG), becomes available for D2D transmission in the RLC entity or in the PDCP entity and either the data belongs to a D2D logical channel with higher priority than the priorities of the logical channels which belong to any LCG and for which data is already available for transmission (NOTE: the highest priority can be assigned to a logical channel configured for public safety such as mission critical voice), or there is no data available for transmission for any of the logical channels (which belong to a LCG), in which case the BSR is referred below to as "regular BSR" for ProSE;

UL resources are allocated and number of padding bits is equal to or larger than the size of the buffer status report MAC CE plus its subheader, in which case the BSR is referred below to as "padding BSR";

retxBSR-Timer expires and the UE has data available for uplink transmission over Uu for any of the logical channels which belong to a LCG, in which case the BSR is referred below to as "Regular BSR";

retxD2DBSR-Timer expires and the UE has data available for D2D transmission for any of the logical channels (which belong to a LCG), in which case the BSR is referred below to as "regular BSR" for ProSE;

periodicBSR-Timer expires, in which case the BSR (related to uplink transmission over Uu) is referred below to as "periodic BSR";

periodicD2DBSR-Timer expires, in which case the BSR (related to D2D transmission) is referred below to as "periodic BSR" for ProSE.

(4) Reporting of the Legacy BSR and/or ProSe BSR

For regular and periodic BSR for uplink transmission over Uu:

if more than one LCG has data available for transmission in the TTI where the BSR is transmitted: report long BSR;

else report short BSR.

For regular and periodic BSR for ProSe:

report ProSe BSR.

For padding BSR:

1> if the number of padding bits is equal to or larger than the size of the short BSR plus its subheader but smaller than the size of the long BSR plus its subheader:

2> if more than one LCG has data available for transmission in the TTI where the BSR is transmitted: report truncated BSR of the LCG with the highest priority logical channel with data available for transmission;

2> else report Short BSR.

1> else if the number of padding bits is equal to or larger than the size of the Long BSR plus its subheader, report Long BSR.

1> if the number of padding bits can accommodate ProSe BSR as well as either short BSR or long BSR;

2> report ProSe BSR.

If the buffer status reporting procedure determines that at least one BSR has been triggered and not cancelled:

1> if the UE has UL resources allocated for new transmission for this TTI:

2> instruct the multiplexing and assembly procedure to generate the BSR MAC CE(s);

2> start or restart periodicBSR-Timer except when all the generated BSRs are truncated BSRs, if the BSR MAC CE(s) contains a BSR for uplink transmission over Uu;

2> start or restart retxBSR-Timer, if the BSR MAC CE(s) contains a BSR for uplink transmission over Uu;

2> start or restart periodicD2DBSR-Timer except when all the generated BSRs are truncated BSRs, if the BSR MAC CE(s) contains a ProSe BSR;

2> start or restart retxD2DBSR-Timer, if the BSR MAC CE(s) contains a ProSe BSR for D2D transmission.

1> else if a regular BSR has been triggered (either for uplink transmission or for D2D transmission):

2> if an uplink grant is not configured or the regular BSR was not triggered due to data becoming available for uplink transmission for a logical channel for which logical channel SR masking (logicalChannelSR-Mask) is setup by upper layers, or if a D2D scheduling assignment is not configured (i.e. not granted) or the regular BSR for ProSe was not triggered due to data becoming available for D2D transmission for a D2D logical channel for which logical channel SR masking (logicalChannelSR-Mask) is setup by upper layers:

3> a SR shall be triggered.

The UE shall restart retxBSR-Timer upon indication of a grant for transmission of new data on any UL-SCH.

The UE may transmit at most one regular/periodic BSR for uplink transmission and, if possible, at most one MAC BSR CE for D2D transmission in a TTI. If the UE is requested to transmit multiple MAC PDUs in a TTI, it may include a padding BSR in any of the MAC PDUs which do not contain a regular/periodic BSR. For BSRs triggered for uplink transmission over Uu, all BSRs transmitted in a TTI may always reflect the buffer status after all MAC PDUs for uplink transmission have been built for this TTI. Each LCG may report at the most one buffer status value per TTI and this value may be reported in all BSRs reporting buffer status for this LCG. For BSRs triggered for D2D transmission, all BSRs transmitted in a TTI may always reflect the buffer status after all MAC PDUs for D2D transmission have been built until this TTI (including this TTI). Each LCG may report at the most one buffer status value per D2D-TTI or per D2D scheduling period and this value shall be reported in all D2D-BSRs reporting buffer status for this LCG. A padding BSR is not allowed to cancel a triggered regular/periodic BSR. A padding BSR is triggered for a specific MAC PDU only and the trigger is cancelled when this MAC PDU has been built.

(5) New Cancelling Conditions for the Legacy BSR and/or ProSe BSR

Figure 16:
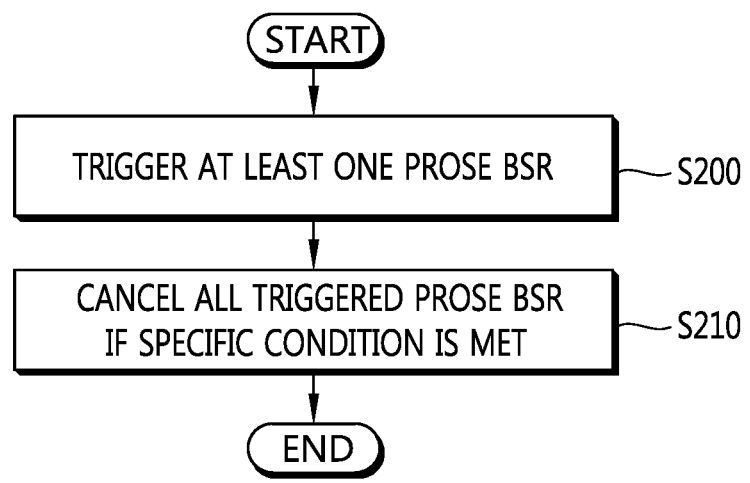
FIG. 16 shows an example of a method for canceling triggered ProSe BSR according to an embodiment of the present invention.

FIG. 16 shows an example of a method for canceling triggered ProSe BSR according to an embodiment of the present invention. In step S200, the UE triggers at least one ProSe BSR. In step S210, the UE cancel all triggered ProSe BSR if a specific condition is met. More specifically, all triggered ProSe BSRs may be canceled in case the D2D scheduling assignment(s) for a (corresponding) D2D scheduling period can accommodate all pending data available for D2D transmission. Or, all triggered ProSe BSRs may be canceled when a ProSe BSR is included in a MAC PDU to be transmitted (to the eNB) in uplink. All triggered BSRs except ProSe BSR may be canceled in case the UL grant(s) in this subframe can accommodate all pending data available for transmission but is not sufficient to additionally accommodate the BSR MAC CEplus its subheader. All triggered BSRs except ProSe BSR may be canceled when a BSR triggered for uplink transmission is included in a MAC PDU for transmission.

It may be assumed that a transport block containing a PDU from a D2D logical channel can be transmitted every D2D-TTI. One D2D scheduling period may consist of one or more D2D-TTIs. One D2D scheduling assignment may indicate one or more D2D transmissions occurring within one D2D scheduling period. One D2D scheduling period may have a single transmission or multiple repetitions of the same D2D scheduling assignments. The D2D scheduling assignment may be transmitted at the beginning of a D2D scheduling period and optionally within a D2D scheduling period.

(6) ProSe BSR MAC CE

According to an embodiment of the present invention, ProSE BSR MAC CE may be newly defined. One or more values of LCG IDs may be assigned to the ProSe BSR MAC CE for short/truncated BSR format and long BSR format. Either short/truncated BSR format or long BSR format may be configured as ProSe BSR by the network. This ProSe BSR may corresponds to Table 4 described below. If the network does not configure ProSe BSR format, the UE may indicate a ProSe BSR format (i.e. short/truncated BSR or long BSR) to the network, e.g. by LCG ID described in Table 3 below or by either MAC CE or RRC message, described in Table 4 below.

TABLE 3

| Index | LCID values |
| --- | --- |
| 00000 | CCCH |
| 00001-01010 | Identity of the logical channel |
| 01011-10101 | Reserved |
| 10110 | Truncated ProSe BSR |
| 10111 | Short ProSe BSR |
| 11000 | Long ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

TABLE 4

| Index | LCID values |
| --- | --- |
| 00000 | CCCH |
| 00001-01010 | Identity of the logical channel |
| 01011-10111 | Reserved |
| 11000 | ProSe BSR |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Referring to Table 3, LCID values for the truncated/short/long ProSe BSR are newly defined. Referring to Table 4, LCID value for the ProSe BSR is newly defined.

The BSR MAC CE described in FIG. 13 above may be used for the short/truncated ProSe BSR, which includes one D2D-LCG ID field and one corresponding buffer size field. Buffer status of D2D logical channels belonging to D2D-LCG may be relected in this short/truncated ProSe BSR, so that the UE includes a D2D-LCG ID in the LCG ID field and buffer status of D2D logical channels in the corresponding buffer size field. If the short/truncated BSR is configured by the network for D2D transmission, the network may assign at least one LGC ID to a group of D2D logical channels (i.e. D2D-LCG ID). If the short/truncated BSR is configured by the UE, the UE may indicate to the network that a certain value of LCG ID is assigned to a group of D2D logical channels.

The BSR MAC CE described in FIG. 14 above may be used for the long ProSe BSR, which includes four buffer size fields, corresponding to D2D-LCG IDs #0 through #3. The network may assign at least one LGC ID to a group of D2D logical channels (i.e. D2D-LCG ID). Alternatively, the UE may assign at least one LGC ID to a group of D2D logical channels, and then indicate to the network that a certain value of LCG ID is assigned to a group of D2D logical channels.

The fields LCG ID and buffer size are defined as follow:
LCG ID (i.e. D2D-LCG ID): The D2D logical channel group ID field identifies the group of D2D logical channel(s) which buffer status is being reported;
Buffer size (i.e. D2D buffer size): The buffer size field identifies the total amount of data available across all D2D logical channels of a D2D logical channel group after all MAC PDUs for the D2D-TTI or for the D2D scheduling period have been built. The amount of data is indicated in number of bytes. It shall include all data that is available for transmission in the RLC layer and in the PDCP layer. The size of the RLC and MAC headers are not considered in the buffer size computation. The length of this field is 6 bits. If extendedBSR-Sizes is not configured, the values taken by the buffer size field are shown in Table 1 described above. If extendedBSR-Sizes is configured, the values taken by the Buffer Size field are shown in Table 2 described above.

(7) Alternative UE MAC operation

Alternatively, if short BSR or long BSR is available as well as ProSe BSR, ProSe BSR may not be de-prioritized under short/long BSR for reporting.

For padding BSR:
1> if the number of padding bits is equal to or larger than the size of the ProSe BSR plus its subheader but smaller than the size of the short BSR plus its subheader (in case that the size of the ProSe BSR is smaller than the size of the short BSR):
2> if more than one D2D-LCG has data available for D2D transmission in a D2D transmission time interval where the BSR is transmitted: report truncated ProSe BSR of the LCG with the highest priority logical channel with data available for transmission;
2> else report ProSe BSR.
1> else if the number of padding bits is equal to or larger than the size of the short BSR plus its subheader but smaller than the size of the long BSR plus its subheader:
2> if more than one LCG has data available for transmission in the TTI where the BSR is transmitted: report truncated BSR of the LCG with the highest priority logical channel with data available for transmission;
2> else report short BSR.
1> else if the number of padding bits is equal to or larger than the size of the ProSe BSR plus its subheader but smaller than the size of the long BSR plus its subheader (in case that the size of the D2D-BSR is not smaller than the size of the short BSR):
2> if more than one LCG has data available for transmission in the TTI where the BSR is transmitted: report truncated ProSe BSR of the LCG with the highest priority logical channel with data available for transmission;
2> else report ProSe BSR.
1> else if the number of padding bits is equal to or larger than the size of the long BSR plus its subheader,
2> report long BSR.

(8) ProSe SR

When an SR is triggered due to either uplink transmission on Uu (i.e. interface between the UE and eNB) or D2D communication (i.e. direct interface among UEs), the triggered SR may be considered as pending until it is cancelled.

According to the prior art of MAC layer in the UE, not only all pending SR(s) for uplink transmission on Uu but also all pending SR(s) for D2D communication may be cancelled and sr-ProhibitTimer may be stopped when a MAC PDU is assembled and this PDU includes a BSR which contains buffer status up to (and including) the last event that triggered a BSR for Uu interface, or when the UL grant(s) can accommodate all pending data available for transmission on Uu. When all pending SR(s) for D2D communication are cancelled, the UE may lose opportunity of requesting D2D resource to the eNB for D2D communication. It may cause delay of D2D transmission for delay-sensitive public safety communication.

In order to solve the problem described above, two methods for providing a SR for requesting D2D scheduling assignment which allocates radio resource used for data transmission over direct interface among UEs may be provided according to an embodiment of the present invention. Hereinafter, it is assumed that the SR is used for requesting UL-SCH resources (i.e. UL grant) or D2D scheduling assignment for new transmission, not only for uplink grant on Uu, but also for scheduling assignment of D2D (i.e. direct communication among UEs). It is further assumed that when an SR is triggered due to either uplink transmission on Uu or D2D, it shall be considered as pending until it is cancelled.

The first method includes triggering a SR for transmission over direct interface among UEs when there is data to be transmitted over the direct interface, triggering a SR for transmission over radio interface with the network. The SR may be triggered by the BSR. The first method further includes assembling a MAC PDU to be transmitted over radio interface with the network, and cancelling all pending SR(s) while not cancelling pending SR(s) triggered for transmission over direct interface among UEs. That is, all pending SR(s) except all pending SR(s) for ProSe may be canceled and sr-ProhibitTimer shall be stopped when a MAC PDU is assembled and this PDU includes a BSR which contains buffer status of uplink transmission (over Uu) up to (and including) the last event that triggered a BSR, or when the UL grant(s) can accommodate all pending data available for transmission.

The second method includes starting the first timer when a SR is triggered for data to be transmitted over the radio interface with the network. The SR for data to be transmitted over the radio interface with the network may be allowed to be transmitted, if the first timer is not running. The second method further includes starting the second timer, while the first timer is running, when a SR is triggered for data to be transmitted over the direct interface among UEs. The SR for data to be transmitted over the direct interface among UEs may be allowed to be transmitted, if the second timer is not running. That is, all pending SR(s) for D2D communication may be cancelled and D2D-sr-ProhibitTimer may be stopped when a MAC PDU is assembled and this PDU includes a BSR which contains buffer status of D2D transmission up to (and including) the last event that triggered a BSR, or when D2D scheduling assignment can accommodate all pending data available for D2D transmission.

If an SR is triggered and there is no other SR pending, the UE shall set the SR_COUNTER to 0. As long as one SR is pending, the UE shall for each TTI:
1> if no UL-SCH resources are available for a transmission in this TTI:
2> if the UE has no valid PUCCH resource for SR configured in any TTI: initiate a random access procedure on the PCell and cancel all pending SRs for requesting UL grant and all pending SRs for requesting D2D scheduling assignment;
2> else if the UE has a valid PUCCH resource for SR configured for this TTI and if this TTI is not part of a measurement gap:
3> if sr-ProhibitTimer is not running and at least one SR is pending for requesting UL grant, or if D2D-sr-Prohibit-Timer is not running and at least one SR is pending for requesting D2D scheduling assignment:
4> if SR_COUNTER<dsr-TransMax:
5> increment SR_COUNTER by 1;
5> instruct the physical layer to signal the SR on PUCCH;
5> start the sr-ProhibitTimer;
5> start the D2D-sr-ProhibitTimer.
4> else:
5> notify RRC to release PUCCH/SRS for all serving cells;
5> clear any configured downlink assignments and uplink grants for Uu;
5> initiate a Random access procedure on the PCell and cancel all pending SRs for requesting UL grant and all pending SRs for requesting D2D scheduling assignment.

Figure 17:
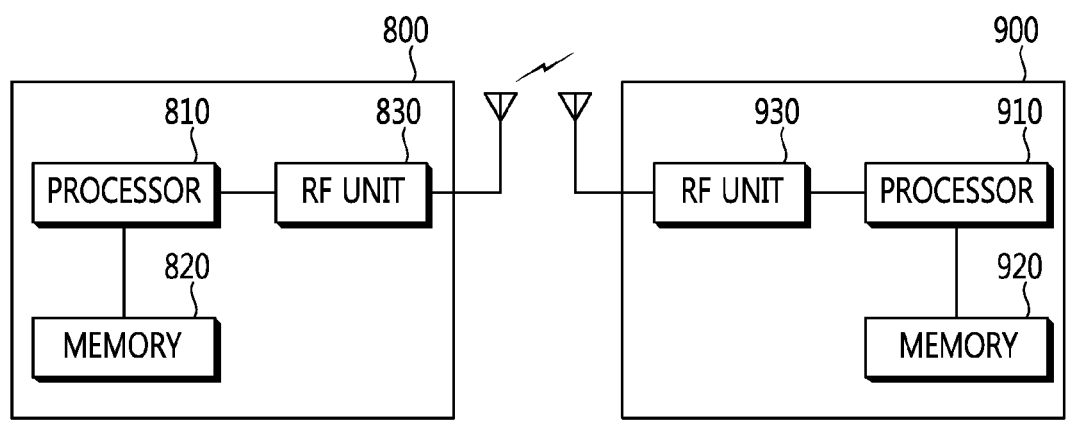
FIG. 17 shows a wireless communication system to implement an embodiment of the present invention.

FIG. 17 shows a wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for canceling, by a user equipment (UE), a triggered proximity-based services (ProSe) buffer status report (BSR) in a wireless communication system, the method comprising:
   triggering, by the UE, at least one ProSe BSR; and
   canceling, by the UE, all triggered ProSe BSR when at least one device-to-device (D2D) scheduling assignment for a D2D scheduling period can accommodate all pending data available for D2D transmission.

2. The method of claim 1, wherein the at least one ProSe BSR provides the network with information about an amount of data available for the D2D transmission.

3. The method of claim 1, further comprising:
   triggering, by the UE, at least one BSR; and
   canceling, by the UE, all triggered BSR, except the ProSe BSR, when a specific condition is met.

4. The method of claim 3, wherein the specific condition is that an uplink grant in a subframe can accommodate all pending data available for transmission but is not sufficient to additionally accommodate a BSR MAC control element (CE) plus its subheader.

5. The method of claim 3, wherein the specific condition is that the at least one BSR triggered for uplink transmission is included in a MAC PDU for transmission.

6. The method of claim 1, wherein the at least one ProSe BSR is triggered when D2D data, for a D2D logical channel, becomes available for D2D transmission in a radio link control (RLC) entity or in a packet data convergence protocol (PDCP) entity and either data belongs to the D2D logical channel with higher priority than priorities of logical channels which belong to any logical channel group (LCG) and for which the data is already available for transmission, or there is no data available for transmission for any of the logical channels.

7. The method of claim 1, wherein the at least one ProSe BSR is triggered when a timer for a regular ProSe BSR expires and the UE has data available for D2D transmission for any logical channel.

8. The method of claim 1, wherein the at least one ProSe BSR is triggered when a timer for a periodic ProSe BSR expires.

9. A user equipment (UE) configured to cancel a triggered proximity-based services (ProSe) buffer status report (BSR) in a wireless communication system, the UE comprising:
   a memory;
   a receiver and a transmitter; and
   a processor, operably coupled to the memory and the receiver and transmitter, that:
   triggers at least one ProSe BSR; and
   cancels all triggered ProSe BSR when at least one device-to-device (D2D) scheduling assignment for a D2D scheduling period can accommodate all pending data available for D2D transmission.

10. The UE of claim 9, wherein the at least one ProSe BSR provides the network with information about an amount of data available for the D2D transmission.

11. The UE of claim 9, wherein the processor further:
   triggers at least one BSR; and
   cancels all triggered BSR, except the ProSe BSR, when a specific condition is met.

* * * * *